Patented Jan. 11, 1938

2,104,956

UNITED STATES PATENT OFFICE 2,104,956

PURIFICATION OF HYDROCARBONS

Georg Stern, Neckargemund, and Werner Hoess, Ludwigshafen-on-the-Rhine, Germany, assignors to I. G. Farbenindustrie Aktiengesellschaft, Frankfort-on-the-Main, Germany No Drawing. Application March 20, 1935, Serial No. 11,962. In Germany March 21, 1934

2 Claims. (Cl. 260—171)

The present invention relates to the purification of hydrocarbons.

It has already been proposed to purify crude hydrocarbons, such as crude benzol, by treating them with $\alpha$-$\beta$-unsaturated aliphatic carbonyl compounds, such as maleic acid anhydride or maleic acid. In the said process a by-product is obtained which is in part soluble in alkalies and may be employed industrially, for example for the preparation of esters or resins.

We have now found that crude hydrocarbons containing dienes can be purified by treatment with $\alpha$-$\beta$-unsaturated aliphatic carbonyl compounds, such as maleic acid anhydride or maleic acid, in a specially advantageous manner and that simultaneously industrially valuable products are obtained as by-products if the said compounds are added in portions, the resulting diene addition products being separated before the addition of further amounts of the said aliphatic carbonyl compounds. The said portions are added in amounts which are each fractions of the amount necessary for separating the dienes completely. The said treatment with $\alpha$-$\beta$-unsaturated aliphatic carbonyl compounds is preferably carried out at ordinary or slightly elevated temperature, at which the formation of resins is avoided. The new process has the advantage that the single dienes present in the initial materials may be recovered separately in the form of their addition products with the said $\alpha$-$\beta$-unsaturated aliphatic carbonyl compounds. If for example cyclopentadiene is present together with methylcyclopentadiene and with acyclic dienes in the said initial materials and if maleic acid anhydride or maleic acid is employed as additional agent, the addition product of maleic acid anhydride or maleic acid with cyclopentadiene is first formed, then that with methylcyclopentadiene and lastly the addition products with acyclic dienes. The portions of the said $\alpha$-$\beta$-unsaturated aliphatic carbonyl compounds, such as of maleic acid anhydride or maleic acid added are preferably so measured that with each portion diene addition products which are as unitary as possible are formed.

As examples of initial liquid hydrocarbon mixtures which may be purified with advantage according to the present invention may be mentioned crude benzol and other hydrocarbon mixtures containing dienes, such as benzines obtained by low temperature carbonization of coals or liquid hydrocarbons resulting from the thermal conversion of gaseous hydrocarbons, such as ethane or its homologues or other hydrocarbon mixtures.

The most suitable amounts of the $\alpha$-$\beta$-unsaturated aliphatic carbonyl compounds may be readily ascertained by a preliminary experiment.

The following examples will further illustrate the nature of this invention but the invention is not restricted to these examples. The parts are by weight.

Example 1

65 parts of maleic acid anhydride are added at room temperature while stirring to 1000 parts of a cracking benzine having a boiling point of from 20° to 120° C. and a bromine value of 205 obtained from Panhandle oil or to single fractions from the said cracking benzine. As soon as the maleic acid anhydride has dissolved, the resulting addition product is precipitated from the reaction mixture by strong cooling to a temperature below 40° C. below zero or distilled under reduced pressure at room temperature or slightly elevated temperature, such as 60° C., or converted into the calcium salt by treatment with milk of lime, preferably while heating. In the latter case, the aqueous layer is separated from the benzine, neutralized if necessary and the difficultly soluble calcium salt filtered off by suction. A further 60 parts of maleic acid anhydride are then added to the benzine and as soon as the maleic acid anhydride has dissolved, the resulting addition product is separated. A further 80 parts of maleic acid anhydride are then added and the resulting addition product separated.

The calcium salts obtained are treated individually, for example with sulphuric acid or alkali metal bisulphate, and the resulting free acids are treated with hot ligroin. In this manner the methyl-bicycloheptene-ortho-dicarboxylic acid passes into solution; the bicycloheptene-ortho-dicarboxylic acid remains as a residue.

If the addition products formed have been separated by strong cooling, to a temperature below 40° C. below zero or by distillation in vacuo, they may also be separated by extraction with hot ligroin after conversion of the anhydrides into acids. From the aqueous filtrates obtained by the separation of the calcium salts of the addition products there can be obtained, after removal of the excess lime, copper salts of addition products of maleic acid with acyclic dienes, as for example by the addition of copper sulphate. In the same manner lead salts of the addition products of maleic acid with acyclic dienes may be obtained by the addition of lead salts, as for example lead acetate.

Example 2

1140 grams of maleic acid anhydride are added, at ordinary temperature and while stirring, in the below described portions to 5000 grams of a liquid hydrocarbon mixture obtained by thermal conversion of gaseous hydrocarbons. Before the addition of each subsequent portion the resulting diene addition product is separated by distillation in vacuo.

The maleic acid anhydride is added in portions of each 100 grams. These portions are added as long as the resulting addition products may still be identified by way of their salts with lead or calcium as addition compounds of cyclopentadiene or methylcyclopentadiene. Thus with the initial material employed 14.5 per cent by weight of cyclic dienes may be separated in the form of their addition products. Thereupon portions of each 14 grams of maleic acid anhydride are added as long as any other addition products are formed. In this manner 3 per cent by weight, with reference to the initial material, of acyclic dienes may be separated in the form of their addition products with 140 grams of maleic acid anhydride. With the first portions of the latter series isoprene and its homologues are separated and also the fulvenes present as may be seen from the disappearance of the yellow color. With the last portions of the maleic acid anhydride piperylene and finally butadiene are removed.

What we claim is:—

1. A process for the purification of a hydrocarbon mixture containing several cyclic dienes and several straight chain dienes and for the separation of the individual dienes present in the form of their addition products which comprises treating this mixture with an α-β-unsaturated aliphatic carbonyl compound whereby the individual dienes present are substantially completely separated from each other by adding this compound in portions to the said mixture, addition compounds of the said aliphatic carbonyl compound with the said dienes thus being formed, and separating from the hydrocarbon mixture the said addition compounds before adding a fresh portion of the said aliphatic carbonyl compound whereby a separation of the individual dienes present is effected.

2. A process for the purification of a hydrocarbon mixture containing several cyclic dienes and several straight chain dienes and for the separation of the individual dienes present in the form of their addition products which comprises adding an α-β-unsaturated aliphatic carbonyl compound selected from the group consisting of maleic acid anhydride and maleic acid in an amount which is only a fraction of the total amount necessary to react with all the dienes present, separating the addition product of a diene and said unsaturated aliphatic carbonyl compound from the hydrocarbon mixture and repeating this process a number of times to purify the hydrocarbon and substantially completely separate the individual dienes from each other.

GEORG STERN.
WERNER HOESS.